United States Patent
Kroes

(10) Patent No.: US 12,415,192 B2
(45) Date of Patent: Sep. 16, 2025

(54) STAINLESS STEEL SPRAY BOOM FOR AERIAL SPRAYING

(71) Applicant: Texas Transland LLC, Wichita Falls, TX (US)

(72) Inventor: Calvin L. Kroes, Loveland, OK (US)

(73) Assignee: Texas Transland LLC, Wichita Falls, TX (US)

( * ) Notice: Subject to any disclaimer, the term of this patent is extended or adjusted under 35 U.S.C. 154(b) by 678 days.

(21) Appl. No.: 17/234,950

(22) Filed: Apr. 20, 2021

(65) Prior Publication Data
US 2022/0331820 A1    Oct. 20, 2022

(51) Int. Cl.
| | |
|---|---|
| *B05B 1/20* | (2006.01) |
| *A01M 7/00* | (2006.01) |
| *B05B 13/00* | (2006.01) |
| *B21K 21/04* | (2006.01) |
| *B64D 1/18* | (2006.01) |

(52) U.S. Cl.
CPC ............ *B05B 1/20* (2013.01); *A01M 7/0071* (2013.01); *B05B 13/005* (2013.01); *B21K 21/04* (2013.01); *B64D 1/18* (2013.01)

(58) Field of Classification Search
CPC ...... B05B 1/20; B05B 13/005; A01M 7/0071; B21K 21/04; B64D 1/18
USPC ......................................................... 239/566
See application file for complete search history.

(56) References Cited

U.S. PATENT DOCUMENTS

| | | | | |
|---|---|---|---|---|
| 3,897,904 A | * | 8/1975 | Kiegerl | F25C 3/04 239/14.2 |
| 4,194,689 A | * | 3/1980 | Ash | F25C 3/04 239/14.2 |
| 4,445,657 A | * | 5/1984 | Breckenridge | A01M 7/0053 248/74.1 |
| 4,465,230 A | * | 8/1984 | Ash | B05B 7/0441 239/14.2 |
| 4,479,610 A | * | 10/1984 | Etheridge | B05B 15/652 239/587.6 |
| 4,927,080 A | * | 5/1990 | Alsing | A01M 7/0064 239/77 |
| 5,234,301 A | * | 8/1993 | Grossberndt | F16B 25/0021 411/386 |
| 5,248,086 A | * | 9/1993 | Waldrum | B05D 1/02 239/10 |
| 6,161,769 A | * | 12/2000 | Kircher | F25C 3/04 239/14.2 |
| 7,225,999 B2 | * | 6/2007 | Foianini | B64D 15/10 239/14.2 |

FOREIGN PATENT DOCUMENTS

EP      0057039 A1 † 8/1982
FR      1189384 A † 10/1959

\* cited by examiner
† cited by third party

*Primary Examiner* — Chee-Chong Lee
(74) *Attorney, Agent, or Firm* — Baker Botts L.L.P.

(57) ABSTRACT

The present disclosure is directed to spray boom for aerial spraying comprising an elongate housing operable to be mounted to an underside of an aircraft, the elongate housing defining a hollow cavity, and a plurality of couplings positioned along at least a portion of a length of the elongate housing, wherein each of the plurality of couplings comprises a cylindrical boss that is unitary with and thermally formed from the elongate housing.

15 Claims, 3 Drawing Sheets

STAINLESS STEEL SPRAY BOOM FOR AERIAL SPRAYING

TECHNICAL FIELD

The present disclosure generally relates to spray booms, and particularly to stainless steel spray booms for aerial spraying by an aircraft.

BACKGROUND

Aerial spraying is often used as a means of applying pesticides, fungicides, herbicides, fertilizers, and other agents to crops in the agriculture, horticulture, and/or forestry industries. Aerial spraying is typically performed by attaching a liquid reservoir to an aircraft, wherein the liquid reservoir is in fluid communication with a plurality of spray nozzles held in place by one or more spray booms attached to the aircraft.

DESCRIPTION OF EXAMPLE EMBODIMENTS

Overview

According to an embodiment, a spray boom for aerial spraying may include an elongate housing operable to be mounted to an underside of an aircraft, the elongate housing defining a hollow cavity, and a plurality of couplings positioned along at least a portion of a length of the elongate housing, wherein each of the plurality of couplings comprises a cylindrical boss that is unitary with and thermally formed from the elongate housing.

Moreover, the elongate housing may comprise a stainless steel composition and may comprise a thickness of at least 0.060 inches.

Additionally, the plurality of couplings may be positioned at least 5 inches apart.

Further, the cylindrical boss may include an opening into the hollow cavity of the elongate housing. Moreover, the cylindrical boss may be thermally formed by via a carbide tool. The application of a rotational movement of the carbide tool at a speed of at least 2500 revolutions per minute (RPM) against the elongate housing may generate friction, thereby generating heat at a temperature ranging between 1900° F. and 2100° F.

Also, the cylindrical boss may comprise a boss length of at least 0.30 inches. An interior surface of the cylindrical boss may be threaded for coupling with a spray nozzle.

According to another embodiment, a method for forming a spray boom for aerial spraying may include the steps of heating an elongate housing at a plurality of locations along a length of the elongate housing using a carbide tool, wherein the step of heating softens a composition of the elongate housing at the plurality of locations; redistributing the softened composition to form a cylindrical boss at each of the plurality of locations, wherein the cylindrical boss is unitary with and thermally formed from the elongate housing; and threading the interior of each cylindrical boss to form a coupling.

Technical advantages of certain embodiments of this disclosure may include one or more of the following. The systems and methods described herein may allow for spray booms having couplings for attaching spray nozzles that are thermally formed from the spray boom housing itself, thereby streamlining the manufacturing process to eliminate the steps of forming pilot holes in the spray boom housing, molding individual couplings, and welding the couplings onto the spray boom housing over the pilot holes. Because the couplings are formed as an extension of the spray boom housing, the couplings are less likely to crack and deform under stress.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Chemical agents, such as pesticides, fungicides, herbicides, fertilizers, and the like, are commonly applied to crops, forests, and other vegetation by aerial spraying. The aircraft used in applying the agents to crops are usually small single-engine airplanes or helicopters that are equipped with a reservoir containing the desired agent to be sprayed. The reservoir may be in fluid communication with one or more spray booms, which may be mounted to the underside, exterior surfaces of the wings or fuselage of the aircraft. A spray boom may comprise a hollow housing fitted with a plurality of spray nozzles along its length. These spray nozzles may attach to the spray boom via a plurality of couplings.

In conventional spray boom systems, the couplings may be manually retrofitted to the spray boom housing by, e.g., drilling pilot holes into the boom housing, molding individual coupling pieces, carefully positioning the couplings over the pilot holes, and then welding the couplings onto the boom housing. There are a number of problems with this technique. Not only are the retrofits often aesthetically malformed by virtue of human error, but the welded couplings are also prone to cracking over time due to the stress and pressure of the fluid dispensed from the boom to the spray nozzles.

The present disclosure is directed to a spray boom for aerial spraying, the spray boom including a plurality of couplings that are thermally formed from the spray boom housing. More specifically, the spray boom includes an elongate housing defining a hollow cavity and a plurality of couplings positioned along at least a portion of a length of the elongate housing, wherein each of the plurality of couplings comprises a cylindrical boss that is unitary with and thermally formed from the elongate housing. Although the systems and methods of the present disclosure have particular application to spray booms mounted onto an aircraft for aerial spraying, it will be appreciated that aspects of the invention may have application to ground spraying as well. However, for purposes of illustration, the present disclosure will reference aerial spraying.

Figure 1A:
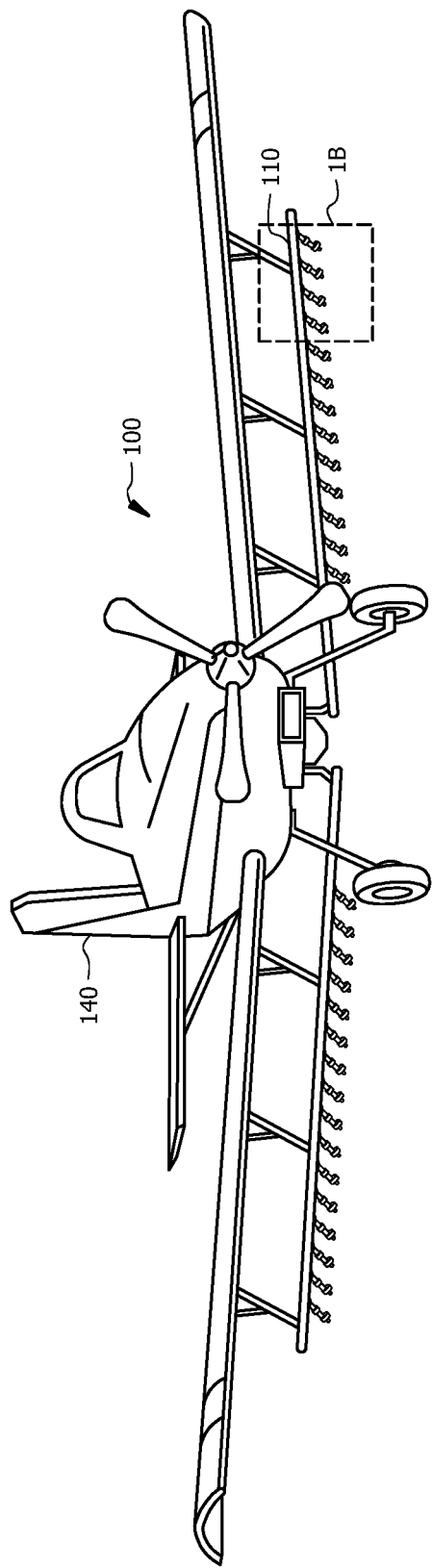
FIG. 1A illustrates a system for aerial spraying from an aircraft, in accordance with certain embodiments.
Figure 1B:
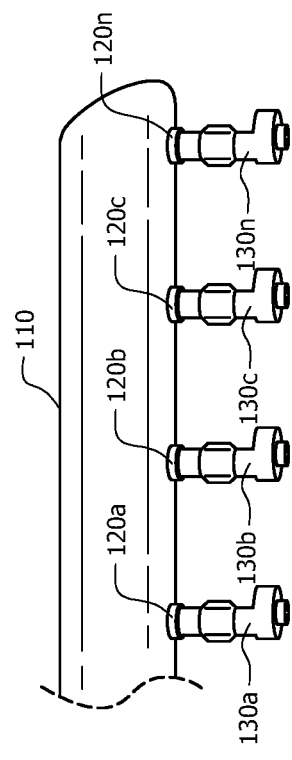
FIG. 1B illustrates an enlarged view of the system for aerial spraying from an aircraft, in accordance with certain embodiments.

FIGS. 1A and 1B depict a system 100 for aerial spraying from an aircraft 140. The system 100 of FIGS. 1A-1B may include a spray boom 110 mounted to the underside of an aircraft 140. Spray boom 110 may be mounted to the aircraft 140 by various mechanisms known in the art. The spray boom 110 may include a plurality of couplings 120a-n formed from the housing of the spray boom 110. The plurality of couplings 120a-n may be adapted to couple the spray boom 110 to a plurality of spray nozzles 130a-n. The spray boom 110 of the present disclosure is described in more detail below with respect to FIGS. 2A and 2B. While the present disclosure has particular application to aircraft and aerial spraying, it may be appreciated that aspects of the invention may have application to ground spraying as well. However, for illustrative purposes, reference will be made to aerial spraying only.

Figure 2A:
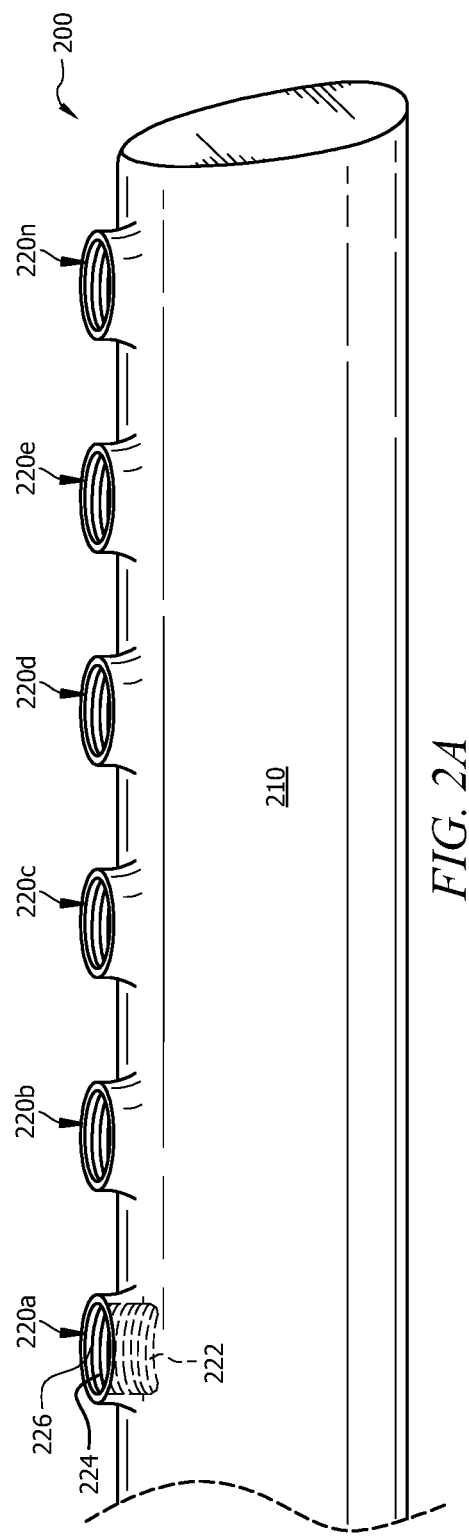
FIG. 2A illustrates a perspective view of a spray boom for aerial spraying, in accordance with certain embodiments.
Figure 2B:
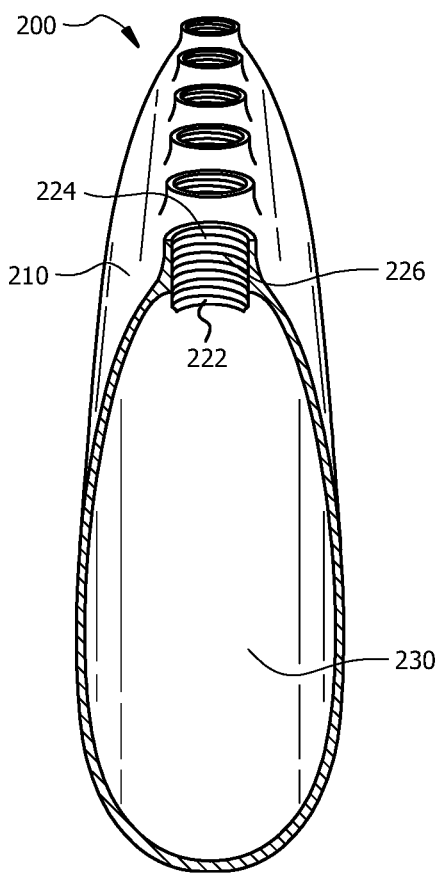
FIG. 2B illustrates a cross-sectional view of a spray boom for aerial spraying, in accordance with certain embodiments.

Reference is now made to FIGS. 2A and 2B, wherein are shown two views of a spray boom 200, in accordance with certain embodiments. FIG. 2A depicts a perspective view of a section of the spray boom 200, and FIG. 2B depicts a cross-sectional view of the spray boom 200. Spray boom 200 may include an elongate housing 210 operable to be mounted to an underside of an aircraft (such as aircraft 140 of FIG. 1). The elongate housing 210 may define an inner hollow cavity 230. In an embodiment, the elongate housing 210 may be generally tubular in structure. The term "tubular" is to be construed broadly in that the cross-sectional shape of the elongate housing 210 may form any shape adapted to be mounted to the underside of an aircraft. For example, FIGS. 2A and 2B depict the elongate housing 210 as generally having a streamline-like cross-section with a substantially ovoid shape. In an embodiment, the elongate housing may comprise a stainless steel material.

The spray boom 200 may further include a plurality of couplings 220a-n spaced apart along at least a portion of the length of the elongate housing 210. In one embodiment, the plurality of couplings may extend along the entire length of the elongate housing 210. In another embodiment, the plurality of couplings 220a-n may extend partially along the length of the elongate housing 210. In an embodiment, the plurality of couplings 220a-n may be spaced along one side of the elongate housing 210. The term "side" may refer to an edge, a surface, a plane, or a line that extends, either wholly or partially, across the length of the elongate housing 210. Although FIG. 2A shows the plurality of couplings 220a-n as comprising six couplings, it is to be understood that the spray boom 200 may be configured with any number of couplings.

Each of the plurality of couplings 220a-n may comprise a cylindrical boss 222 that is unitary with, and thermally formed from, the elongate housing 210. For purposes of simplicity, only one cylindrical boss 222 is labeled in FIGS. 2A and 2B; however, it is to be understood that each coupling of the plurality of couplings 220a-n may comprise a cylindrical boss. The cylindrical boss 222 may include a hole or an opening 224 from the exterior of the elongate housing 210 into the hollow cavity 230 of the elongate housing 210. Moreover, the cylindrical boss 222 may project (or extend) at least partially from the exterior surface of the elongate housing 210, while also at least partially extending into the hollow cavity 230 of the elongate housing 210. Thus, the length of the cylindrical boss 222 may be adapted for attachment to a spray nozzle.

Each cylindrical boss 222 is formed from (or is an extension of) the composition, e.g., stainless steel, that forms the elongate housing 210. In accordance with the present disclosure, a cylindrical boss 222 may be formed from the elongate housing 210 using a carbide tool. In an embodiment, the carbide tool may comprise a tungsten carbide tool. While the disclosure may hereafter refer to the tool as a tungsten carbide tool, it is to be understood that the disclosure is not necessarily limited to a tungsten carbide tool and may comprise any tool operable to thermally form a cylindrical boss, as described herein. The operation of a tungsten carbide tool is generally understood in the art, and may include applying a rotational movement of the tool against a material, here, the stainless steel elongate housing 210, to generate friction, which in turn produces heat. In an embodiment, the tungsten carbide tool may operate at a rotational speed of at least 2500 RPM, and generate heat within a range between 1900° F. and 2100° F. In this range, the stainless steel material of the elongate housing 210 may soften until it becomes malleable.

The softened stainless steel composition of the elongate housing 210 may then be forced by the tungsten carbide tool to flow and redistribute to form a cylindrical shape around the tool. As the tungsten carbide tool is directed further into the softened composition of the elongate housing 210, the cylindrical shape may lengthen and form the cylindrical boss. The resulting cylindrical boss 222 may be five to six times longer than the original thickness of the elongate housing 210. In an embodiment, the thickness of the elongate housing 210 may be at least 0.060 inches, and in some applications may be approximately 0.063 inches, thereby rendering the length of the cylindrical boss (i.e., boss length) to be between 0.30 to 0.38 inches, which may be sufficient for thread engagement with a spray nozzle. Once the composition has cooled, threading 226 may be applied to the interior of the cylindrical boss 222 using a threading tool. The threading 226 may be adapted for coupling with a spray nozzle. While threading 226 is labeled only on one cylindrical boss 222 in FIGS. 2A and 2B, it is to be understood that each cylindrical boss associated with each coupling of the plurality of couplings 220a-n may be threaded.

In an embodiment, as the stainless steel composition of the elongate housing 210 is heated, softened, and redistributed, virtually no material is lost or discarded. Moreover, no additional material is required to be deposited or added onto the elongate housing 210 to create the cylindrical boss 222. In an embodiment, the plurality of couplings 220a-n (each coupling comprising a cylindrical boss 222) may be spaced at least five (5) inches apart. In yet another embodiment, the plurality of couplings may be spaced five (5) to twelve (12) inches apart, or otherwise, as deemed appropriate for particular applications.

Figure 3:
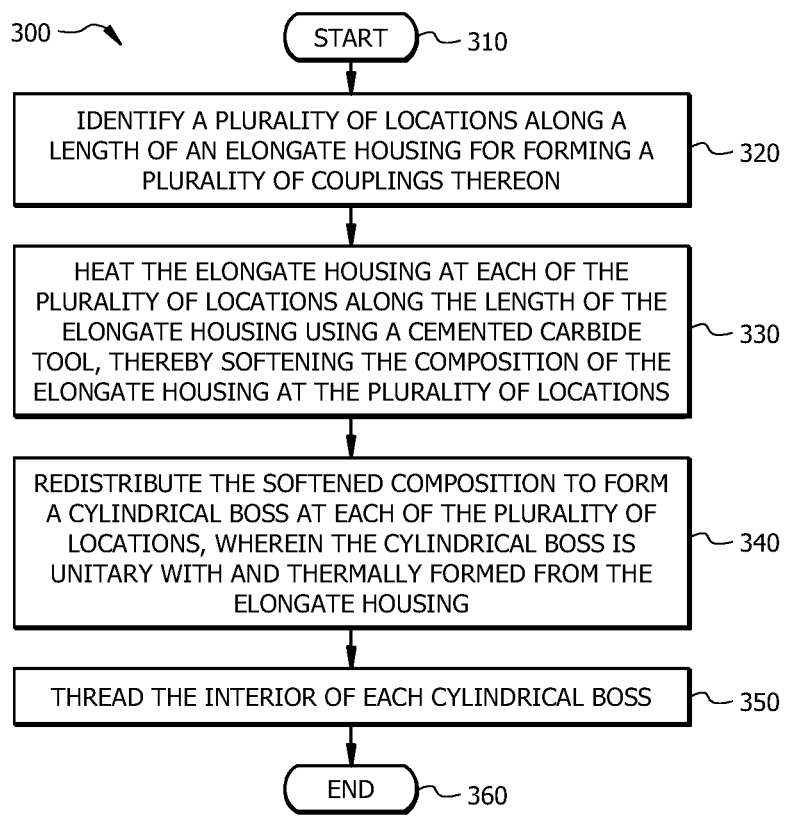
FIG. 3 illustrates a flow diagram of a method for forming a spray boom for aerial spraying, in accordance with certain embodiments.

Reference is now made to FIG. 3, wherein is shown a flow diagram of a method 300 for forming a spray boom, according to an embodiment. In an embodiment, the spray boom may be formed from a hollow elongate housing composed of stainless steel. The method may begin at step 310.

At step 320, a plurality of locations along a length of the elongate housing may be identified for forming a plurality of couplings thereon. In one embodiment, the plurality of locations may extend along the entire length of the elongate housing. In another embodiment, the plurality of locations may extend partially along the length of the elongate housing. In an embodiment, the plurality of locations on which to form the plurality of couplings may be spaced along one side of the elongate housing. The term "side" may refer to an edge, a surface, a plane, or a line that extends, either wholly or partially, across the length of the elongate housing. In an embodiment, the plurality of locations on which to form the plurality of couplings may be spaced anywhere between five (5) to twelve (12) inches apart, or otherwise, as deemed appropriate for particular applications.

At step 330, the elongate housing may be heated at each of the plurality of locations along the length of the elongate housing using a carbide tool. In an embodiment, the carbide tool may comprise a tungsten carbide tool, and while the present disclosure may hereafter refer to the tool as such, it is to be understood that the method is not necessarily limited to the use of a tungsten carbide tool, as described above. The step of heating may soften the composition (e.g., stainless steel) of the elongate housing at the plurality of locations. Specifically, in accordance with the operative mechanism of tungsten carbide tools, as generally understood in the art, the application of a rotational movement of the tool against a material (here, the material comprising, e.g., the stainless steel composition of the elongate housing) generates friction, which in turn generates heat. In an embodiment, the tungsten carbide tool may operate at a rotational speed of at least 2500 RPM, thereby generating heat in the range of 1900° F. — 2100° F. At this temperature range, the stainless steel composition of the elongate housing may soften until it reaches a malleable plastic-like state. It is to be understood that the step of heating the elongate housing at each of the plurality of locations may be performed sequentially, i.e., location by location for each of the plurality of locations. Alternatively, the step of heating may be performed simultaneously to some degree, i.e., two or more locations heated at the same time.

At step 340, the softened composition may be redistributed to form a cylindrical boss at each of the plurality of locations along the elongate housing, wherein the cylindrical boss is unitary with and thermally formed from the elongate housing. In an embodiment, the tungsten carbide tool may be used to form the softened composition into a cylindrical boss. Specifically, the tungsten carbide tool may force the softened composition to flow and redistribute to form a cylindrical shape around the tool. As the tungsten carbide tool is directed further into the softened composition of the elongate housing, the cylindrical boss may lengthen. The resulting cylindrical boss may be five to six times longer than the original thickness of the elongate housing. In an embodiment, the thickness of the elongate housing may be at least 0.060 inches, and in many applications may be approximately 0.063 inches, thereby rendering the length of the cylindrical boss to be anywhere between 0.30 to 0.38 inches, which may be sufficient for engagement with a spray nozzle. Once the cylindrical boss is formed to the appropriate length, the tungsten carbide tool may be immediately removed.

At step 350, after the composition has cooled to a temperature less than 200° F., the interior of each cylindrical boss may be threaded to form a coupling. The threading of the interiors of all of the cylindrical bosses at the plurality of locations may form the plurality of couplings. The method may end at step 360.

In sum, the systems and methods of the present disclosure may allow for spray booms, such as stainless steel spray booms, having couplings (for coupling the spray booms to spray nozzles, etc.) that are formed from the spray boom itself, thereby eliminating the need for drilling pilot holes into the boom housing, molding separate couplings, and then positioning and welding the couplings onto the boom housing over the pilot holes. The result not only provides for an efficient manufacturing process, but also extends the life of the spray boom and the couplings, as the couplings are unlikely to crack and deform under stress when formed from the spray boom housing.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A spray boom for aerial spraying comprising:
an elongate housing operable to be mounted to an underside of an aircraft, the elongate housing comprising a composition with a thickness of at least 0.08 inches, and defining a hollow cavity; and a plurality of couplings positioned along at least a portion of a length of the elongate housing, wherein each of the plurality of couplings comprises a cylindrical boss, wherein the cylindrical boss:

extends partially within the hollow cavity;

is unitary with and thermally formed by causing the composition to heat to a first temperature by the application of a rotational movement of a tool to the elongate housing; wherein the temperature first temperature is between 1900° F. and 2100° F.; and has a threaded interior surface that is formed while the composition is at a second temperature, wherein the second temperature is lower than the first temperature, wherein the second temperature is a temperature less than 200° F.

2. The spray boom of claim 1, wherein the composition is a stainless steel composition.

3. The spray boom of claim 2, wherein the cylindrical boss comprises the stainless steel composition.

4. The spray boom of claim 1, wherein the plurality of couplings are positioned at least 5 inches apart.

5. The spray boom of claim 1, wherein the cylindrical boss comprises an opening into the hollow cavity of the elongate housing.

6. The spray boom of claim 1, wherein the tool is a carbide tool.

7. The spray boom of claim 6, wherein application of a rotational movement of the carbide tool at a speed of at least 2500 revolutions per minute (RPM) against the elongate housing generates friction, thereby generating heat.

8. The spray boom of claim 1, wherein the cylindrical boss comprises a boss length of at least 0.30 inches.

9. The spay boom of claim 1, wherein the elongate housing comprises a cross section having a substantially ovoid shape.

10. A spray boom for aerial spraying comprising:

an elongate housing operable to be mounted to an underside of an aircraft, the elongate housing comprising a composition with a thickness of at least 0.08 inches, and defining a hollow cavity, wherein the elongate housing comprises an exterior surface; and a plurality of couplings positioned along at least a portion of a length of the elongate housing, wherein each of the plurality of couplings comprises a cylindrical boss, wherein the cylindrical boss:

extends both partially into the hollow cavity and partially outward from the exterior surface;

is unitary with and thermally formed by causing the composition to heat up to a first temperature by the application of a rotational movement of a tool to the elongate housing; wherein the temperature first temperature is between 1900° F. and 2100° F.; and has a threaded interior surface that is formed while the composition is at a second temperature, wherein the second temperature is lower than the first temperature, wherein the second temperature is a temperature less than 200° F.

11. The spray boom of claim 10, wherein application of the rotational movement of the tool is at a speed of at least 2500 revolutions per minute (RPM).

12. The spray boom of claim 10, wherein the cylindrical boss comprises a boss length of at least 0.30 inches.

13. The spray boom of claim 12, wherein the boss length is larger than the thickness.

14. The spray boom of claim 13, wherein the cylindrical boss comprises an opening into the hollow cavity of the elongate housing.

15. A spray boom for aerial spraying comprising:

an elongate housing operable to be mounted to an underside of an aircraft, the elongate housing defining a hollow cavity, wherein the elongate housing comprises an exterior surface, a thickness of at least 0.08 inches, a stainless steel composition, and a cross section having a substantially ovoid shape; and a plurality of couplings positioned along at least a portion of a length of the elongate housing, wherein the plurality of couplings are positioned at least 5 inches apart, wherein each of the plurality of couplings comprises a cylindrical boss, wherein the cylindrical boss comprises the stainless steel composition, a threaded interior surface, an opening into the hollow cavity of the elongate housing, and a boss length of at least 0.30 inches, wherein the cylindrical boss extends both partially into the hollow cavity and partially outward from the exterior surface;

is unitary with and thermally formed by causing the stainless steel composition to heat up to a first temperature between 1900° F. and 2100° F. by an application of a rotational movement of a carbide tool of a speed of at least 2500 revolutions per minute (RPM) against the elongate housing; and, has a threaded interior surface that is formed while the stainless steel composition is at a second temperature that is less than 200° F.

* * * * *